(12) United States Patent
Tsukuda et al.

(10) Patent No.: US 11,274,600 B2
(45) Date of Patent: Mar. 15, 2022

(54) COMBINED CYCLE PLANT, CONTROL DEVICE THEREOF, AND OPERATION METHOD THEREOF

(71) Applicant: Mitsubishi Hitachi Power Systems, Ltd., Kanagawa (JP)

(72) Inventors: Yuya Tsukuda, Yokohama (JP); Yasuhiro Shirahama, Yokohama (JP)

(73) Assignee: MITSUBISHI POWER, LTD., Kanagawa (JP)

(*) Notice: Subject to any disclaimer, the term of this patent is extended or adjusted under 35 U.S.C. 154(b) by 318 days.

(21) Appl. No.: 16/678,517

(22) Filed: Nov. 8, 2019

(65) Prior Publication Data

US 2020/0149471 A1 May 14, 2020

(30) Foreign Application Priority Data

Nov. 12, 2018 (JP) .............................. JP2018-211980

(51) Int. Cl.
| | |
|---|---|
| *F02C 6/18* | (2006.01) |
| *F02N 9/04* | (2006.01) |
| *F01K 23/10* | (2006.01) |
| *F01K 13/02* | (2006.01) |

(52) U.S. Cl.
CPC .............. *F02C 6/18* (2013.01); *F01K 13/02* (2013.01); *F01K 23/105* (2013.01); *F02N 9/04* (2013.01)

(58) Field of Classification Search
CPC .......... F01K 13/02; F01K 23/105; F02C 6/18; F02C 9/42; F02N 9/04; F22B 1/18; F22B 1/1815; Y02E 20/16
See application file for complete search history.

(56) References Cited

U.S. PATENT DOCUMENTS

| 5,737,911 A * | 4/1998 | Hoizumi ................... F02C 6/18 60/783 |
| 7,107,774 B2 * | 9/2006 | Radovich ................ F01K 13/02 122/7 B |
| 10,196,942 B2 * | 2/2019 | Matsumoto ............. F01K 11/02 |

(Continued)

FOREIGN PATENT DOCUMENTS

| EP | 1 701 006 | 9/2006 |
| JP | 7-83005 | 3/1995 |

(Continued)

*Primary Examiner* — Jesse S Bogue
(74) *Attorney, Agent, or Firm* — Wenderoth, Lind & Ponack, L.L.P.

(57) ABSTRACT

A control device causes a combined cycle plant to perform a first operation section, a second operation section, and a third operation section. In the first operation section, a first gas turbine unit and a steam turbine are driven without driving an auxiliary combustion device. The control device causes the plant to perform the second operation section in which the first gas turbine unit, the auxiliary combustion device, and the steam turbine are driven when a required output equal to or greater than a maximum output in the first operation section is received. The control device causes the plant to perform the third operation section in which the first gas turbine unit, the second gas turbine unit, and the steam turbine are driven without driving an auxiliary combustion device when a required output equal to or greater than a maximum output in the second operation section is received.

9 Claims, 7 Drawing Sheets

(56) References Cited

U.S. PATENT DOCUMENTS

| | | | |
|---|---|---|---|
| 10,344,627 B2* | 7/2019 | Nakamura | F01K 13/006 |
| 10,774,691 B2* | 9/2020 | Kobayashi | F01K 23/10 |
| 2010/0275610 A1 | 11/2010 | Oguchi et al. | |
| 2018/0017031 A1 | 1/2018 | Matsushiro et al. | |
| 2021/0285369 A1* | 9/2021 | Henning | F02C 3/14 |

FOREIGN PATENT DOCUMENTS

| JP | 2006-266258 | 10/2006 |
|---|---|---|
| JP | 2009-79580 | 4/2009 |
| JP | 2009-221863 | 10/2009 |
| JP | 4913087 | 4/2012 |
| JP | 2018-9491 | 1/2018 |

\* cited by examiner

COMBINED CYCLE PLANT, CONTROL DEVICE THEREOF, AND OPERATION METHOD THEREOF

BACKGROUND OF THE INVENTION

Field of the Invention

The present invention relates to a combined cycle plant including a gas turbine (hereinafter may also be referred to as GT), a heat recovery steam generator (hereinafter may also be referred to as HRSG) which generates steam using an exhaust gas from the GT, and a steam turbine driven by steam generated by the HRSG, a control device thereof, and an operation method thereof.

Priority is claimed on Japanese Patent Application No. 2018-211980 filed in Japan on Nov. 12, 2018, the content of which is incorporated herein by reference.

Description of Related Art

As a combined cycle plant, for example, as described in Patent Document 1 below, there is a plant including an auxiliary combustion burner (may also be called a duct burner) which injects fuel into a steam generator frame of a heat recovery steam generator (HRSG) and burns the fuel in the steam generator frame.

The technology described in Patent Document 1 discloses a technology in which fuel is temporarily sent to an auxiliary combustion burner in order to suppress variation in flow rate of steam supplied from the HRSG to the steam turbine.

PATENT DOCUMENTS

[Patent Document 1] Japanese Unexamined Patent Application, First Publication No. H07-083005

SUMMARY OF THE INVENTION

In a combined cycle plant, improvement in plant efficiency is required.

Therefore, it is an objective of the present invention to provide a combined cycle plant in which plant efficiency can be improved, a control device thereof, and an operating method thereof.

An operation method of a combined cycle plant as one aspect according to the present invention for achieving the above-described objective is an operation method of the following combined cycle plant.

The combined cycle plant includes a first gas turbine unit, a steam turbine, an auxiliary combustion device, and a second gas turbine unit. The first gas turbine unit includes a first gas turbine and a first heat recovery steam generator which is configured to generate steam using heat of an exhaust gas of the first gas turbine. The steam turbine is configured to be driven by steam generated from the first heat recovery steam generator. The auxiliary combustion device is configured to burn fuel in a steam generator frame of the first heat recovery steam generator to increase an amount of generated steam so that an output of the steam turbine is increased. The second gas turbine unit includes a second gas turbine and a second heat recovery steam generator which is configured to generate steam using heat of an exhaust gas of the second gas turbine.

An operation method of the combined cycle plant performs a first operation section in which the first gas turbine unit is driven without driving the auxiliary combustion device, or the first gas turbine unit and the steam turbine are driven without driving the auxiliary combustion device, a second operation section in which the first gas turbine unit, the auxiliary combustion device, and the steam turbine are driven when a required output that is equal to or greater than a maximum output in the first operation section is received, and a third operation section in which the first gas turbine unit, the second gas turbine unit, and the steam turbine are driven without driving the auxiliary combustion device when a required output that is equal to or greater than a maximum output in the second operation section is received.

In the second operation section, auxiliary combustion fuel that does not contribute to driving of the gas turbine is injected even when an output of the first gas turbine is a maximum output of the gas turbine. Therefore, a plant efficiency is somewhat lower than an efficiency of one gas turbine in the second operation section.

Here, an operation section in which the first gas turbine unit, the second gas turbine unit, and the steam turbine are driven without driving the auxiliary combustion device, and of which a plant output in the second operation section is the same as that in the second operation section is referred to as an alternative second operation section. In the alternative second operation section, an output of each gas turbine in two gas turbine units is substantially ½ of the maximum output of the gas turbine. Therefore, plant efficiency significantly decreases in the alternative second operation section. Therefore, the plant efficiency in the second operation section is higher than the plant efficiency in the alternative second operation section.

In the present aspect, the second operation section can be performed. Therefore, in the present aspect, plant efficiency can be improved.

In the operation method of the combined cycle plant of the one aspect, any one of performance of the alternative second operation section in which the first gas turbine unit, the second gas turbine unit, and the steam turbine are driven without driving the auxiliary combustion device, and performance of the second operation section may be selectable when a required output that is equal to or greater than a maximum output in the first operation section is received.

It is conceivable that, in a short period of time after the control device has received a required output in a specific range in which the second operation section can be performed from the outside, the control device may receive another required output that is larger than the required output in the specific range. In this case, at a time point at which the control device has received the required output in the specific range, the time required until another required output is satisfied after receiving another required output that is larger than the required output of the specific range can be shortened when the alternative second operation section with two gas turbine units is performed rather than when the second operation section with one gas turbine unit is performed.

Therefore, in the present aspect, even when the control device receives a required output in the specific range in which the second operation section can be performed from the outside, any one of performance of the second operation section and performance of the alternative second operation section can be selected.

In the operation method of the combined cycle plant of the one aspect capable of executing the alternative second operation section, an indication that any one of the alternative second operation section and the second operation section is executable may be displayed when a required output that is equal to or greater than a maximum output in the first operation section is received.

In the operation method of the combined cycle plant of the one aspect in which an indication that either one of the operation sections of two types can be performed is displayed, a plant efficiency when the alternative second operation section is performed and a plant efficiency when the second operation section is performed may be displayed.

In the present aspect, an indication that one operation section between the alternative second operation section and the second operation section can be performed, and the plant efficiency when the alternative second operation section is performed and the plant efficiency when the second operation section is performed are displayed. Therefore, an operator can easily select performance of one operation section between the alternative second operation section and the second operation section from a viewpoint of plant efficiency.

An operation method of a combined cycle plant as another aspect according to the present invention for achieving the above-described objective is an operation method applied to the following combined cycle plant.

The combined cycle plant includes a plurality of gas turbine units, each having one gas turbine, and one heat recovery steam generator which is configured to generate steam using heat of an exhaust gas from the gas turbine, and one or more steam turbines which can be driven by steam from the heat recovery steam generator for each of the plurality of gas turbine units. The gas turbine includes a combustor which is configured to burn fuel and a main fuel valve which is configured to adjust a flow rate of fuel supplied to the combustor. The heat recovery steam generator includes a frame through which the exhaust gas passes, an auxiliary combustion burner which is configured to inject fuel into the frame and burn the fuel in the frame, and an auxiliary combustion fuel valve which is configured to adjust a flow rate of fuel supplied to the auxiliary combustion burner.

An operation method of the combined cycle plant performs a required output receiving step of receiving a required output for the combined cycle plant from the outside, an operation mode setting step of determining an operation mode of the combined cycle plant, and a valve control step of determining an opening degree of the main fuel valve and an opening degree of the auxiliary combustion fuel valve for each of the plurality of gas turbine units in accordance with the operation mode and the required output, and instructing the opening degree to the main fuel valve and the opening degree to the auxiliary combustion fuel valve for each of the plurality of gas turbine units. In the operation mode setting step, among the plurality of gas turbine units, any operation mode is determined between a standard operation mode in which fuel is sent to any of the combustors of the plurality of gas turbine units and fuel is not sent to any of the auxiliary combustion burners of the plurality of gas turbine units, and an auxiliary combustion operation mode in which fuel is sent to any of the combustors of the plurality of gas turbine units, and fuel is sent to the auxiliary combustion burners of the gas turbine units having the combustors to which fuel is sent. In the operation mode setting step, the alternative auxiliary combustion operation mode can be determined as the operation mode when an alternative auxiliary combustion operation mode, in which a plant output thereof is the same as a plant output in the standard operation mode in which fuel is sent to the combustors of M gas turbine units, can be implemented as an auxiliary combustion operation mode in which fuel is sent to the auxiliary combustion burners of (M−1) (M is a natural number of 2 or more) gas turbine units among the plurality of gas turbine units.

A control device of a combined cycle plant as one aspect according to the present invention for achieving the above-described objective is a control device of the following combined cycle plant.

The combined cycle plant includes a first gas turbine unit, a steam turbine, an auxiliary combustion device, and a second gas turbine unit. The first gas turbine unit includes a first gas turbine and a first heat recovery steam generator which is configured to generate steam using heat of an exhaust gas of the first gas turbine. The steam turbine is configured to be driven by steam generated from the first heat recovery steam generator. The auxiliary combustion device is configured to burn fuel in a steam generator frame of the first heat recovery steam generator to increase an amount of generated steam so that an output of the steam turbine is increased. The second gas turbine unit includes a second gas turbine and a second heat recovery steam generator which is configured to generate steam using heat of an exhaust gas of the second gas turbine.

A control device of the combined cycle plant includes a control unit which controls the first gas turbine unit, the steam turbine, the auxiliary combustion device, and the second gas turbine unit such that they are able to perform a first operation section in which the first gas turbine unit is driven without driving the auxiliary combustion device, or the first gas turbine unit and the steam turbine are driven without driving the auxiliary combustion device, a second operation section in which the first gas turbine unit, the auxiliary combustion device, and the steam turbine are driven when a required output that is equal to or greater than a maximum output in the first operation section is received, and a third operation section in which the first gas turbine unit, the second gas turbine unit, and the steam turbine are driven without driving the auxiliary combustion device when a required output that is equal to or greater than a maximum output in the second operation section is received.

The control device of the combined cycle plant of the one aspect may further include a receiving unit which receives any one selection between an alternative second operation section in which the first gas turbine unit, the second gas turbine unit, and the steam turbine are driven without driving the auxiliary combustion device, and the second operation section, and causes the control unit to perform the received operation section when a required output that is equal to or greater than a maximum output in the first operation section is received.

The control device of the combined cycle plant of the above-described aspect having the receiving unit may further include a display unit which displays an indication that any one of the alternative second operation section and the second operation section is executable when a required output that is equal to or greater than a maximum output in the first operation section is received.

In the control device of the combined cycle plant of the one aspect having the display unit, the display unit may display the plant efficiency when the alternative second operation section is performed and the plant efficiency when the second operation section is performed.

A combined cycle plant as one aspect according to the present invention for achieving the above-described objective includes the control device of any of the above-described aspects, the first gas turbine unit, the steam turbine, the auxiliary combustion device, and the second gas turbine unit.

A control device of a combined cycle plant as another aspect according to the present invention for achieving the above-described objective is a control device of the following combined cycle plant.

The combined cycle plant includes a plurality of gas turbine units, each having one gas turbine, and one heat recovery steam generator which generates steam using heat of an exhaust gas from the gas turbine, and one or more steam turbines which can be driven by steam from the heat recovery steam generator for each of the plurality of gas turbine units. The gas turbine includes a combustor which burns fuel and a main fuel valve which adjusts a flow rate of fuel supplied to the combustor. The heat recovery steam generator includes a frame through which the exhaust gas passes, an auxiliary combustion burner which injects fuel into the frame and burns the fuel in the frame, and an auxiliary combustion fuel valve which adjusts a flow rate of fuel supplied to the auxiliary combustion burner.

A control device of the combined cycle plant includes a required output receiving unit which receives a required output for the combined cycle plant from the outside, an operation mode setting unit which determines an operation mode of the combined cycle plant, and a valve control unit which determines an opening degree of the main fuel valve and an opening degree of the auxiliary combustion fuel valve for each of the plurality of gas turbine units in accordance with the operation mode and the required output, and instructs the opening degree to the main fuel valve and the opening degree to the auxiliary combustion fuel valve for each of the plurality of gas turbine units. Among the plurality of gas turbine units, the operation mode setting unit determines any operation mode between a standard operation mode in which fuel is sent to any of the combustors of the plurality of gas turbine units and fuel is not sent to any of the auxiliary combustion burners of the plurality of gas turbine units, and an auxiliary combustion operation mode in which fuel is sent to any of the combustors of the plurality of gas turbine units, and fuel is sent to the auxiliary combustion burners of the gas turbine units having the combustors to which fuel is sent. The operation mode setting unit can determine the alternative auxiliary combustion operation mode as the operation mode when the alternative auxiliary combustion operation mode, in which a plant output thereof is the same as a plant output in the standard operation mode in which fuel is sent to the combustor of M gas turbine units, can be implemented in an auxiliary combustion operation mode in which fuel is sent to the auxiliary combustion burners of (M−1) (M is a natural number of 2 or more) gas turbine units among the plurality of gas turbine units.

In the alternative auxiliary combustion operation mode, auxiliary combustion fuel that does not contribute to driving of the gas turbine is injected, for example, even when an output of one gas turbine is an allowable maximum output of the gas turbine. Therefore, a plant efficiency is somewhat lower than an efficiency of one gas turbine in the alternative auxiliary combustion operation mode.

In a corresponding standard operation mode in which a plant output thereof in the alternative auxiliary combustion operation mode is the same as that in the alternative auxiliary combustion operation mode, an output of each gas turbine in the M gas turbine units is substantially (M−1)/M of the allowable maximum output of the gas turbine. In the corresponding standard operation mode, an output of each gas turbine, for example, in two gas turbine units is substantially ½ of the allowable maximum output of the gas turbine. Also, in the corresponding standard operation mode, an output of each gas turbine in three gas turbine units is approximately ⅔ of the allowable maximum output of the gas turbine. Therefore, plant efficiency significantly decreases in the corresponding standard operation mode. Therefore, the plant efficiency in the alternative auxiliary combustion operation mode is higher than the plant efficiency in the corresponding standard operation mode.

In the present aspect, the alternative auxiliary combustion operation mode can be performed. Therefore, in the present aspect, plant efficiency can be improved.

Here, in the control device of the combined cycle plant of the above-described aspect, the operation mode setting unit may include a display unit which displays an indication that one operation mode between the alternative auxiliary combustion operation mode and the standard operation mode can be selected when the alternative auxiliary combustion operation mode is available with respect to the required output, an operation mode receiving unit which receives the one operation mode for the display content on the display unit, and an operation mode determination unit which determines the one operation mode received by the operation mode receiving unit as the operation mode of the combined cycle plant.

It is conceivable that, in a short period of time after the required output receiving unit has received a required output in a specific range in which the alternative auxiliary combustion operation mode can be performed, the required output receiving unit may receive another required output that is larger than the required output in the specific range. In this case, at a time point at which the required output receiving unit has received the required output in the specific range, the time required until another required output is satisfied after receiving another required output that is larger than the required output in the specific range can be shortened when the standard operation mode with M gas turbines units is performed rather than when the alternative auxiliary combustion operation mode with (M−1) gas turbine units is performed.

Therefore, in the present aspect, even when the required output receiving unit receives a required output of a specific range, it is configured such that the operator is allowed to select whether to perform the alternative auxiliary combustion operation mode with (M−1) gas turbine units or to perform the standard operation mode with M gas turbine units so that an operation mode selected by the operator can be performed.

Also, in the control device of the combined cycle plant of the above-described aspect having the display unit, the display unit may display the plant efficiency when the alternative auxiliary combustion operation mode is performed and the plant efficiency when the standard operation mode is performed.

In the present aspect, the display unit displays an indication that one operation mode between the alternative auxiliary combustion operation mode and the standard operation mode can be selected, the plant efficiency when the alternative auxiliary combustion operation mode is performed, and the plant efficiency when the standard operation mode is performed. Therefore, the operator can easily select one operation mode between the alternative auxiliary combustion operation mode and the standard operation mode from a viewpoint of plant efficiency.

A combined cycle plant as another aspect according to the present invention for achieving the above-described objective includes the control device of another aspect described above, the plurality of gas turbine units, and one or more steam turbines described above.

According to one aspect of the present invention, the plant efficiency can be improved.

DETAILED DESCRIPTION OF THE INVENTION

Hereinafter, various embodiments of a combined cycle plant according to the present invention will be described with reference to the drawings.

First Embodiment

First, a first embodiment of a combined cycle plant according to the present invention will be described with reference to FIGS. 1 to 5.

Figure 1:
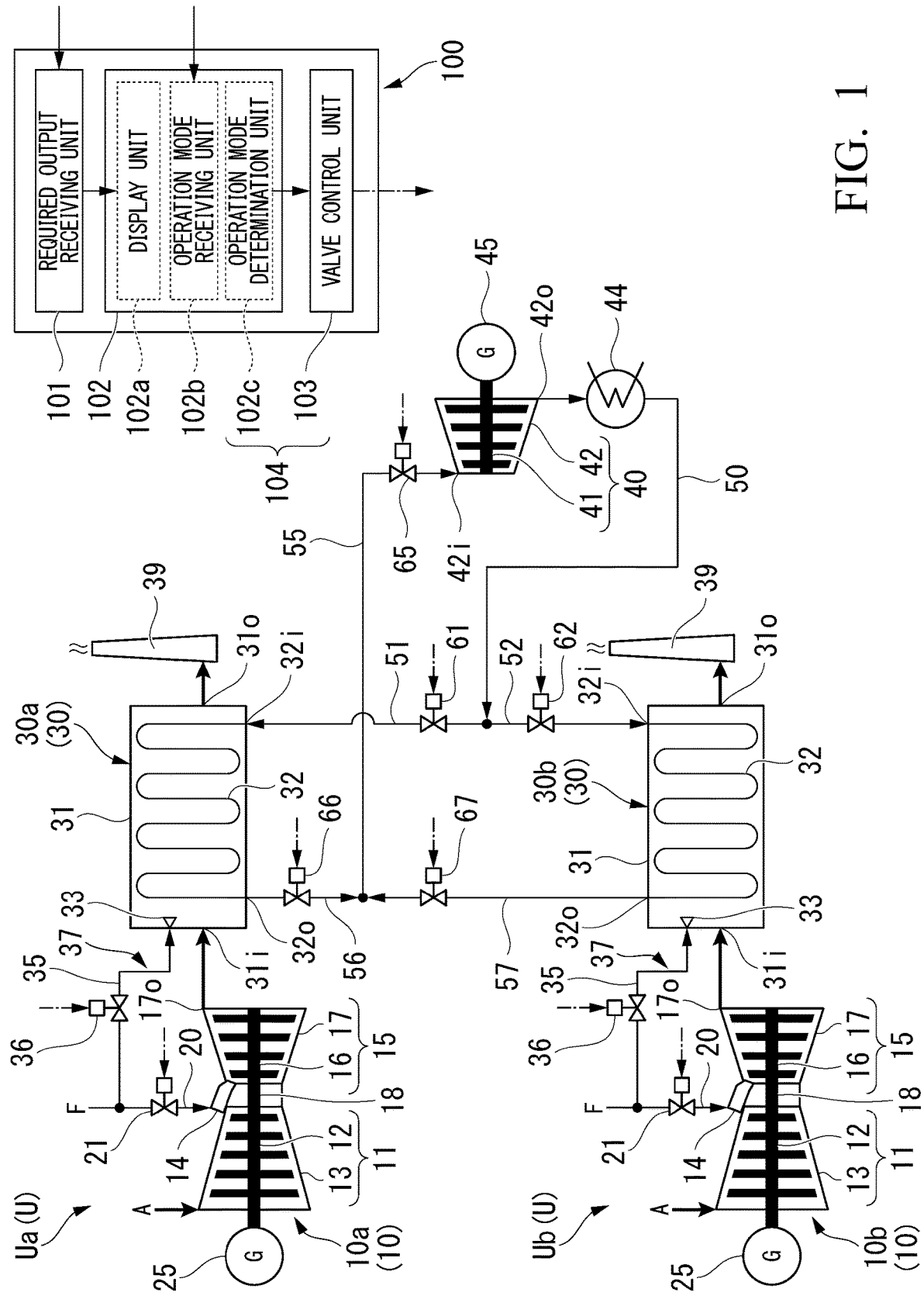
FIG. 1 is a system diagram of a combined cycle plant of a first embodiment according to the present invention.

As shown in FIG. 1, the combined cycle plant of the present embodiment includes two gas turbine units U, one steam turbine 40, a condenser 44 which returns steam exhausted from the steam turbine 40 to water, and a steam turbine power generator 45 which generates electric power by driving the steam turbine 40.

Each of the two gas turbine units U includes one gas turbine 10, one heat recovery steam generator (HRSG) 30 which generates steam using heat of an exhaust gas from the gas turbine 10, and one gas turbine power generator 25 which generates electric power by driving the gas turbine 10. The gas turbine 10 includes a compressor 11 which compresses air, a combustor 14 which generates a combustion gas by burning fuel in the air compressed by the compressor 11, a turbine 15 which is driven by the combustion gas at high temperature and high pressure, and a main fuel valve 21 which adjusts a flow rate of fuel F supplied to the combustor 14. The compressor 11 includes a compressor rotor 12 which rotates around an axis, and a compressor casing 13 which covers the compressor rotor 12. A main fuel line 20 is connected to the combustor 14. The main fuel valve 21 is provided in the main fuel line 20. The turbine 15 includes a turbine rotor 16 which rotates around an axis, and a turbine casing 17 which covers the turbine rotor 16. The turbine rotor 16 of the turbine 15 and the compressor rotor 12 of the compressor 11 rotate around the same axis and are connected to each other to form a gas turbine rotor 18. A rotor of the gas turbine power generator 25 is connected to the gas turbine rotor 18.

Further, for convenience of the following description, of the two gas turbine units U, the gas turbine 10 included in a first gas turbine unit Ua is referred to as a first gas turbine 10a, and the HRSG 30 included in the first gas turbine unit Ua is referred to as a first HRSG 30a. Of the two gas turbine units U, the gas turbine 10 included in a second gas turbine unit Ub is referred to as a second gas turbine 10b, and the HRSG 30 included in the second gas turbine unit Ub is referred to as a second HRSG 30b.

The HRSG 30 includes a steam generator frame 31 through which the exhaust gas from the gas turbine 10 flows, and a heat-transfer tube 32 disposed in the steam generator frame 31. The steam generator frame 31 includes an exhaust gas inlet 31i through which the exhaust gas flows in, and an exhaust gas outlet 310 through which the exhaust gas flows out. An exhaust port 17o of the turbine 15 and the exhaust gas inlet 31i of the steam generator frame 31 are connected so that the exhaust gas from the turbine 15 flows into the steam generator frame 31. The exhaust gas outlet 310 of the steam generator frame 31 and a chimney 39 are connected so that the exhaust gas from the steam generator frame 31 flows into the chimney 39. The heat-transfer tube 32 includes a water inlet 32i through which water flows in and a steam outlet 32o through which steam flows out. The water inlet 32i is positioned on the exhaust gas outlet 310 side of the steam generator frame 31, and the steam outlet 32o is positioned on the exhaust gas inlet 31i side of the steam generator frame 31. The heat-transfer tube 32 exchanges heat between the exhaust gas flowing in the steam generator frame 31 from the exhaust gas inlet 31i toward the exhaust gas outlet 310 side and water or steam flowing in the heat-transfer tube 32. An auxiliary combustion device 37 is provided in the HRSG 30. The auxiliary combustion device 37 includes an auxiliary combustion burner 33 which injects fuel into the steam generator frame 31, an auxiliary combustion fuel line 35 which guides fuel to the auxiliary combustion burner 33, and an auxiliary combustion fuel valve 36 which adjusts a flow rate of fuel supplied to the auxiliary combustion burner 33. The auxiliary combustion fuel valve 36 is provided in the auxiliary combustion fuel line 35.

A first water supply line 51 is connected to the water inlet 32i of the first HRSG 30a. A first water supply valve 61 which adjusts a flow rate of water flowing through the first water supply line 51 is provided in the first water supply line 51. A second water supply line 52 is connected to the water inlet 32i of the second HRSG 30b. A second water supply valve 62 which adjusts a flow rate of water flowing through the second water supply line 52 is provided in the second water supply line 52. A first steam line 56 is connected to the steam outlet 32o of the first HRSG 30a. A first steam valve 66 which adjusts a flow rate of steam flowing through the first steam line 56 is provided in the first steam line 56. A second steam line 57 is connected to a steam outlet 32o of the second HRSG 30b. A second steam valve 67 which adjusts a flow rate of steam flowing through the second steam line 57 is provided in the second steam line 57.

The steam turbine 40 includes a steam turbine rotor 41 which rotates around an axis, and a steam turbine casing 42 which covers the steam turbine rotor 41. A rotor of the steam turbine power generator 45 is connected to the steam turbine rotor 41. The steam turbine casing 42 includes a steam inlet 42i and a steam exhaust port 42o. A main steam line 55 is connected to the steam inlet 42i. A main steam valve 65 which adjusts a flow rate of steam flowing through the main steam line 55 is provided in the main steam line 55. The main steam line 55 is connected to the first steam line 56 and the second steam line 57 described above. The condenser 44 is connected to the steam exhaust port 42o. A main water supply line 50 is connected to the condenser 44. The main water supply line 50 branches into two lines. Of the two lines, one line is the first water supply line 51 and the other line is the second water supply line 52.

The combined cycle plant of the present embodiment further includes a control device 100 which controls an operation of each valve described above. The control device 100 includes a required output receiving unit 101 which receives a required output for the combined cycle plant, an operation mode setting unit 102 which determines an operation mode of the combined cycle plant, and a valve control unit 103 which instructs an opening degree for each of the plurality of valves.

The operation mode setting unit 102 determines any operation mode between a standard operation mode and an auxiliary combustion operation mode. The standard operation mode is an operation mode in which fuel is sent to the combustor 14 of at least one gas turbine unit U of the two gas turbine units U and fuel is not sent to each auxiliary combustion burner 33 of the two gas turbine units U. The auxiliary combustion operation mode is an operation mode in which fuel is sent to the combustor 14 of at least one gas turbine unit U of the two gas turbine units U and fuel is sent to the auxiliary combustion burner 33 of the one gas turbine unit U. That is, fuel is sent to the combustor 14 of at least one gas turbine unit U of the two gas turbine units U in both the standard operation mode and the auxiliary combustion operation mode. However, fuel is not sent to the auxiliary combustion burners 33 of the two gas turbine units U in the standard operation mode, and fuel is sent to the auxiliary combustion burner 33 of at least one gas turbine unit U in the auxiliary combustion operation mode.

The operation mode setting unit 102 includes a display unit 102a, an operation mode receiving unit 102b, and an operation mode determination unit 102c. When an alternative auxiliary combustion operation mode can be implemented with respect to a required output, the display unit 102a displays an indication that one operation mode between the alternative auxiliary combustion operation mode and the standard operation mode can be selected. Here, the alternative auxiliary combustion operation mode is an auxiliary combustion operation mode in which fuel is sent only to the combustor 14 of one gas turbine unit U (for example, the first gas turbine unit Ua) of the two gas turbine units U and fuel is sent to the auxiliary combustion burner 33 of the one gas turbine unit U (for example, the first gas turbine unit Ua), and is an auxiliary combustion operation mode whose plant output is the same as a plant output in the standard operation mode in which fuel is sent to the combustors 14 of the two gas turbine units U and fuel is not sent to the auxiliary combustion burners 33 of the two gas turbine units U. The operation mode receiving unit 102b receives one operation mode for a display content on the display unit 102a. The operation mode determination unit 102c determines one operation mode received by the operation mode receiving unit 102b as the operation mode of the combined cycle plant. Further, a standard operation mode in which a plant output thereof is the same as a plant output of the alternative auxiliary combustion operation mode is referred to as a corresponding standard operation mode.

The valve control unit 103 determines an opening degree for each of the plurality of valves described above according to the operation mode determined by the operation mode setting unit 102 and the required output received by the required output receiving unit 101, and instructs an opening degree corresponding to each of the valves.

The operation mode determination unit 102c, the valve control unit 103, and the plurality of valves described above constitute a control unit 104.

Next, changes in output and efficiency of the combined cycle plant with the passage of time will be described with reference to FIG. 2

When fuel supply to the first gas turbine 10a is started (t1) and a flow rate of the fuel is gradually increased with the passage of time, an output of the first gas turbine 10a (indicated by a dashed-dotted line in the figure) gradually increases with the passage of time. In a process in which the fuel supplied to the first gas turbine 10a is increased, since only the first gas turbine 10a is driven among the first gas turbine 10a, the second gas turbine 10b, and the steam turbine 40 which are included in the combined cycle plant, a plant output (indicated by a thin solid line in the figure) is the same as the output of the first gas turbine 10a.

Gas turbine efficiency increases as the fuel supplied to the gas turbine 10 increases and a temperature of the combustion gas increases. Therefore, in the process in which the fuel supplied to the first gas turbine 10a is increased, a plant efficiency $\eta$ (indicated by a thick solid line in the figure) also increases with the passage of time.

Further, the plant efficiency $\eta$ is a value obtained by dividing the plant output by a thermal energy of the fuel supplied to the plant.

When the output of the first gas turbine 10a reaches an allowable maximum output Pgtc (t2) that has been determined for the first gas turbine 10a, the flow rate of fuel supplied to the first gas turbine 10a is made constant. As a result, the output of the first gas turbine 10a is maintained at the allowable maximum output Pgtc. Further, in the following description, the flow rate of the fuel supplied to the gas turbine 10 when the gas turbine 10 is at the allowable maximum output is referred to as an allowable maximum flow rate.

The first HRSG 30a heats water using heat of the exhaust gas exhausted from the first gas turbine 10a and converts the water into steam. When a state quantity of steam from the first HRSG 30a satisfies a supply condition with respect to the steam turbine 40, supply of steam to the steam turbine 40 is started (t2), and a flow rate of the steam is gradually increased with the passage of time. When the flow rate of the steam supplied to the steam turbine 40 is gradually increased, an output of the steam turbine 40 (indicated by a long-dashed line in the figure) also gradually increases. In a process in which the supply of steam to the steam turbine 40 is started and the flow rate of the steam is increased, since the first gas turbine 10a and the steam turbine 40 are driven among the first gas turbine 10a, the second gas turbine 10b, and the steam turbine 40 which are included in the combined cycle plant, the plant output is a sum of the output of the first gas turbine 10a and the output of the steam turbine 40. Therefore, the plant output at this time point increases by an increment of the output of the steam turbine 40 even when the output of the first gas turbine 10a is constant at the allowable maximum output Pgtc.

Even when the flow rate of fuel supplied to the first gas turbine 10a is constant, when the output of the steam turbine 40 increases, the plant output increases as described above. Therefore, even when the flow rate of fuel supplied to the first gas turbine 10a is constant, the plant efficiency η increases in accordance with increase in the output of the steam turbine 40 in a process in which the flow rate of the steam supplied to the steam turbine 40 increases.

When the output of the first gas turbine 10a is constant at the allowable maximum output Pgtc, then the flow rate of the steam generated by heat of the exhaust gas from the first gas turbine 10a also is constant. Therefore, when the output of the first gas turbine 10a is constant at the allowable maximum output Pgtc, the output of the steam turbine 40 due to the heat of the exhaust gas from the first gas turbine 10a temporarily increases, but thereafter does not increase (t3) and becomes constant at Pstc1. As a result, at time t3, a plant output P becomes a value P1 obtained by adding the allowable maximum output Pgtc of the first gas turbine 10a to an output Pstc1 of the steam turbine 40 at that time.

Here, an output of the steam turbine 40 when two gas turbine units U are driven, the output of each gas turbine 10 is the allowable maximum output Pgtc, and the auxiliary combustion device 37 is not driven is assumed to be an allowable maximum output (100%) of the steam turbine 40. The output Pstc1 of the steam turbine 40 described above is a maximum output of the steam turbine 40 when only one gas turbine unit U is driven without driving the auxiliary combustion device 37. The Pstc1 is about 50% of the allowable maximum output of the steam turbine 40. Also, a plant output P3 when the two gas turbine units U and the steam turbine 40 are driven, the output of each gas turbine 10 is the allowable maximum output Pgtc, and the auxiliary combustion device 37 is not driven is assumed to be a maximum output (100%) of the plant. A plant output P1 obtained by adding the output Pstc1 of the steam turbine 40 to the allowable maximum output Pgtc of the gas turbine 10 described above is a maximum output when only one gas turbine unit U and the steam turbine 40 are driven without driving the auxiliary combustion device 37. The plant output P1 is about 50% of the maximum plant output P3.

Also, an operation section from the time t1 to t3 described above is referred to as a first operation section. That is, the first operation section is an operation section in which the first gas turbine unit Ua is driven without driving the auxiliary combustion device 37 or the first gas turbine unit Ua and the steam turbine 40 are driven without driving the auxiliary combustion device 37.

Here, it is assumed that, when the output of the steam turbine 40 due to heat of the exhaust gas from the first gas turbine 10a does not increase and is constant at Pstc1 (t3), fuel is caused to be injected from the auxiliary combustion burner 33 into the steam generator frame 31 and the fuel is burned in the steam generator frame 31. When the fuel burns in the steam generator frame 31, a flow rate of steam generated from the HRSG 30 increases even when an amount of steam generated due to the heat of the exhaust gas from the first gas turbine 10a is constant. Therefore, when the fuel is injected into the steam generator frame 31 from the auxiliary combustion burner 33, the output of the steam turbine 40 increases by an amount of thermal energy (indicated by a short-dashed line in the figure) of the fuel ejected from the auxiliary combustion burner 33.

Therefore, even when the output of the first gas turbine 10a is constant at the allowable maximum output Pgtc and the amount of steam generated due to the heat of the exhaust gas from the first gas turbine 10a is constant, when fuel is injected from the auxiliary combustion burner 33, the output of the steam turbine 40 increases, and as a result, the plant output also increases. However, the fuel injected from the auxiliary combustion burner 33 does not contribute to driving of the first gas turbine 10a. Therefore, when fuel is injected from the auxiliary combustion burner 33, the plant efficiency η decreases from η1 to η2.

When a flow rate of the fuel is gradually increased after fuel supply from the auxiliary combustion burner 33 has started (t3), the output of the steam turbine 40 and the plant output increase as the amount of fuel increases while the plant efficiency η decreases from η1 to η2 as described above. When the flow rate of fuel injected from the auxiliary combustion burner 33 reaches an allowable maximum flow rate (t4), the flow rate of fuel is made constant at the allowable maximum flow rate. As a result, the output of the steam turbine 40, the plant output P, and the plant efficiency η become constant. The plant output P at this time reaches a maximum output P2 in the auxiliary combustion operation mode.

When the flow rate of fuel is gradually decreased after the flow rate of fuel injected from the auxiliary combustion burner 33 has been made constant for a predetermined time (t5), the output of the steam turbine 40 and the plant output P decrease from P2 to P1 while the plant efficiency η increases from η2 to η1 as the amount of fuel decreases.

At a time point (t6) at which the fuel supply to the auxiliary combustion burner 33 is stopped, a required output for the combined cycle plant is assumed to be, for example, an allowable maximum output of the combined cycle plant. In this case, the second gas turbine 10b is started and the second gas turbine 10b is driven together with the first gas turbine 10a.

Here, an operation section from the time t3 to t6 described above is referred to as a second operation section. That is, the second operation section is an operation section in which the first gas turbine unit Ua, the auxiliary combustion device 37, and the steam turbine 40 are driven when the required output of the maximum output P1 in the first operation section is received. The maximum output in the second operation section is the maximum output P2 in the auxiliary combustion operation mode described above. In other words, the maximum output P2 in the second operation section is a plant output when the first gas turbine 10a is at the allowable maximum output Pgtc and the flow rate of fuel from the auxiliary combustion device 37 is the allowable maximum flow rate.

When the second gas turbine 10b is started and the second gas turbine 10b is driven together with the first gas turbine 10a, a state quantity of steam generated from the first HRSG 30a and a state quantity of steam generated from the second HRSG 30b need to be made uniform.

For this reason, when the second gas turbine 10b is started at the time point (t6) at which the fuel supply to the auxiliary combustion burner 33 is stopped as described above, the flow rate of fuel supplied to the first gas turbine 10a is gradually decreased while fuel supply to the second gas turbine 10b is started and a flow rate of the fuel is gradually increased. When the flow rate of fuel supplied to the first gas turbine 10a gradually decreases, the output of the first gas turbine 10a gradually decreases. Also, when the fuel supply to the second gas turbine 10b is started and the flow rate of fuel is gradually increased, an output of the second gas turbine 10b (indicated by a two-dot dashed line in the figure) increases gradually.

Immediately after the fuel supply to the second gas turbine 10b is started, steam cannot be supplied from the second HRSG 30b to the steam turbine 40. Also, in the process in which a supply amount of fuel to the first gas turbine 10a is gradually decreased, a flow rate of steam supplied from the first HRSG 30a to the steam turbine 40 also gradually decreases. Therefore, immediately after the fuel supply to the second gas turbine 10b is started while the flow rate of fuel supplied to the first gas turbine 10a gradually decreases, the output of the steam turbine 40 gradually decreases.

Therefore, immediately after the fuel supply to the second gas turbine 10b is started while the supply amount of fuel to the first gas turbine 10a gradually decreases, the plant output P decreases.

As described above, the gas turbine efficiency increases as the fuel supplied to the gas turbine 10 increases and a temperature of the combustion gas increases. Therefore, immediately after the fuel supply to the second gas turbine 10b is started while the supply amount of fuel to the first gas turbine 10a gradually decreases, an efficiency of the first gas turbine 10a and an efficiency of the second gas turbine 10b are lower than when the fuel of the allowable maximum flow rate is supplied to each of the first gas turbine 10a and the second gas turbine 10b. Moreover, at this time point, an efficiency of the steam turbine 40 also decreases. Therefore, immediately after the fuel supply to the second gas turbine 10b is started while the supply amount of fuel to the first gas turbine 10a gradually decreases, the plant efficiency η significantly decreases.

When the output of the first gas turbine 10a is the same as the output of the second gas turbine 10b (t7), the flow rate of fuel supplied to the first gas turbine 10a is maintained for a predetermined time and the flow rate of fuel supplied to the second gas turbine 10b is maintained for the predetermined time. As a result, the state quantity of steam generated from the first HRSG 30a and the state quantity of steam generated from the second HRSG 30b are aligned When the state quantity of steam from the second HRSG 30b satisfies a supply condition with respect to the steam turbine 40 (t8) while the flow rate of fuel supplied to each gas turbine 10 is maintained, supply of the steam from the second HRSG 30b to the steam turbine 40 is started. Therefore, the output of the steam turbine 40 gradually increases from the time point (t8).

While the flow rate of fuel supplied to each gas turbine 10 is maintained and before the state quantity of steam from the second HRSG 30b satisfies the supply condition with respect to the steam turbine 40 (t8), the plant output and the plant efficiency η are constant. Also, while the flow rate of fuel supplied to each gas turbine is maintained and after the state quantity of steam from the second HRSG 30b satisfies the supply condition with respect to the steam turbine 40 (t8), the plant output and the plant efficiency η gradually increase as the output of the steam turbine 40 increases.

After the flow rate of fuel supplied to each gas turbine 10 is maintained for the predetermined time (t9), the flow rate of fuel supplied to each gas turbine 10 is gradually increased. The output and efficiency of each gas turbine 10 also gradually increase. Further, steam from the first HRSG 30a and steam from the second HRSG 30b flow into the steam turbine 40, and the output and efficiency of the steam turbine 40 gradually increase. Therefore, in the process of gradually increasing the flow rate of fuel supplied to each gas turbine 10 after the flow rate of fuel supplied to each gas turbine 10 has been maintained for the predetermined time (t9), the plant efficiency η increases rapidly.

When an output of the first gas turbine 10a and an output of the second gas turbine 10b reach the allowable maximum output Pgtc (t10), the flow rate of fuel supplied to the first gas turbine 10a and the second gas turbine 10b becomes constant. As a result, outputs of the first gas turbine 10a and the second gas turbine 10b are maintained at the allowable maximum output Pgtc. When flow rates of fuel supplied to the first gas turbine 10a and the second gas turbine 10b become constant, then flow rates of steam generated from the first HRSG 30a and the second HRSG 30b also become constant, and the output of the steam turbine 40 also becomes constant. The output of the steam turbine 40 at this time is the allowable maximum output (100%) of the steam turbine 40 as described above.

When the output of the first gas turbine 10a and the output of the second gas turbine 10b reach the allowable maximum output Pgtc (t10), an efficiency of each turbine 15 is maximized and the efficiency of the steam turbine 40 is also maximized. Therefore, when the output of the first gas turbine 10a and the output of the second gas turbine 10b reach the allowable maximum output Pgtc (t10), the plant efficiency η also is at its highest η 6.

Here, an operation section after the time t6 described above is referred to as a third operation section. That is, the third operation section is an operation section in which the first gas turbine unit Ua, the auxiliary combustion device 37, and the steam turbine 40 are driven when a required output that is equal to or greater than the maximum output P2 in the second operation section is received.

Figure 3:
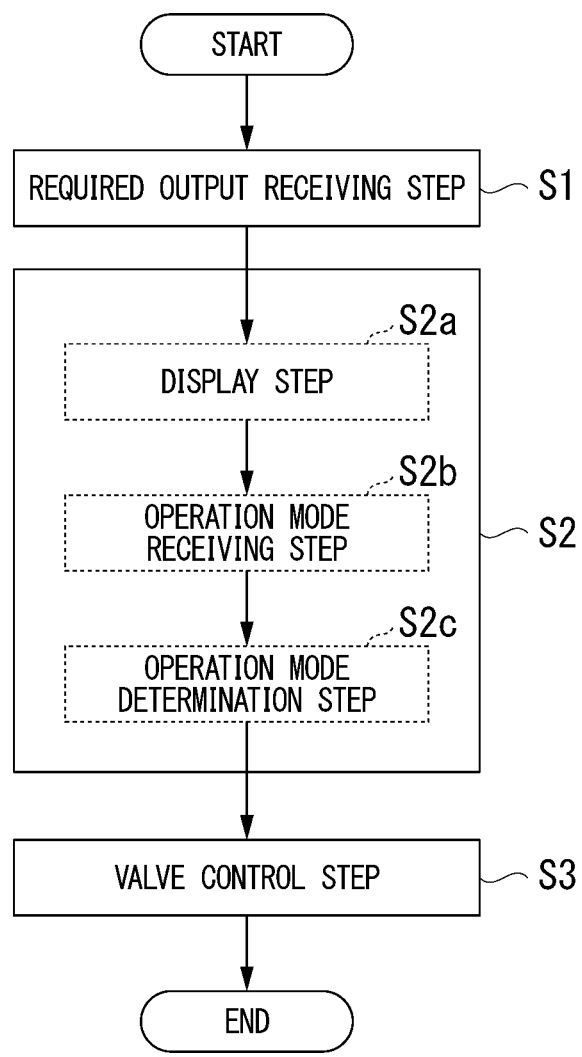
FIG. 3 is a flowchart showing an operation of a control device of the combined cycle plant in the first embodiment according to the present invention.

Next, an operation of the control device 100 of the present embodiment will be described according to the flowchart shown in FIG. 3.

First, the required output receiving unit 101 receives a required output for the combined cycle plant from the outside (S1: Required output receiving step).

When the required output receiving unit 101 receives a required output, the operation mode setting unit 102 determines one operation mode between the standard operation mode and the auxiliary combustion operation mode as the operation mode (S2: Operation mode setting step). The operation mode setting unit 102 determines the standard operation mode as the operation mode except for a case in which the required output is an output within a specific range (P1 to P2).

When the standard operation mode is determined as the operation mode by the operation mode setting unit 102, the valve control unit 103 determines valve opening degrees of the main fuel valve 21 and the auxiliary combustion fuel valve 36 and outputs a valve opening degree command indicating the valve opening degrees to these valves (S3: Valve control step). The standard operation mode is an operation mode in which fuel is not injected from the auxiliary combustion burner 33. Therefore, when the standard operation mode is determined as the operation mode, the valve control unit 103 outputs a valve opening degree command for setting the opening degree of each auxiliary combustion fuel valve 36 of the two gas turbine units U to 0 to each auxiliary combustion fuel valve 36. Also, the valve control unit 103 determines a flow rate of fuel to the combustor 14 that satisfies the required output. Then, the valve control unit 103 determines an opening degree of the main fuel valve 21 according to the flow rate and outputs a valve opening degree command indicating the opening degree to the main fuel valve 21.

Figure 2:
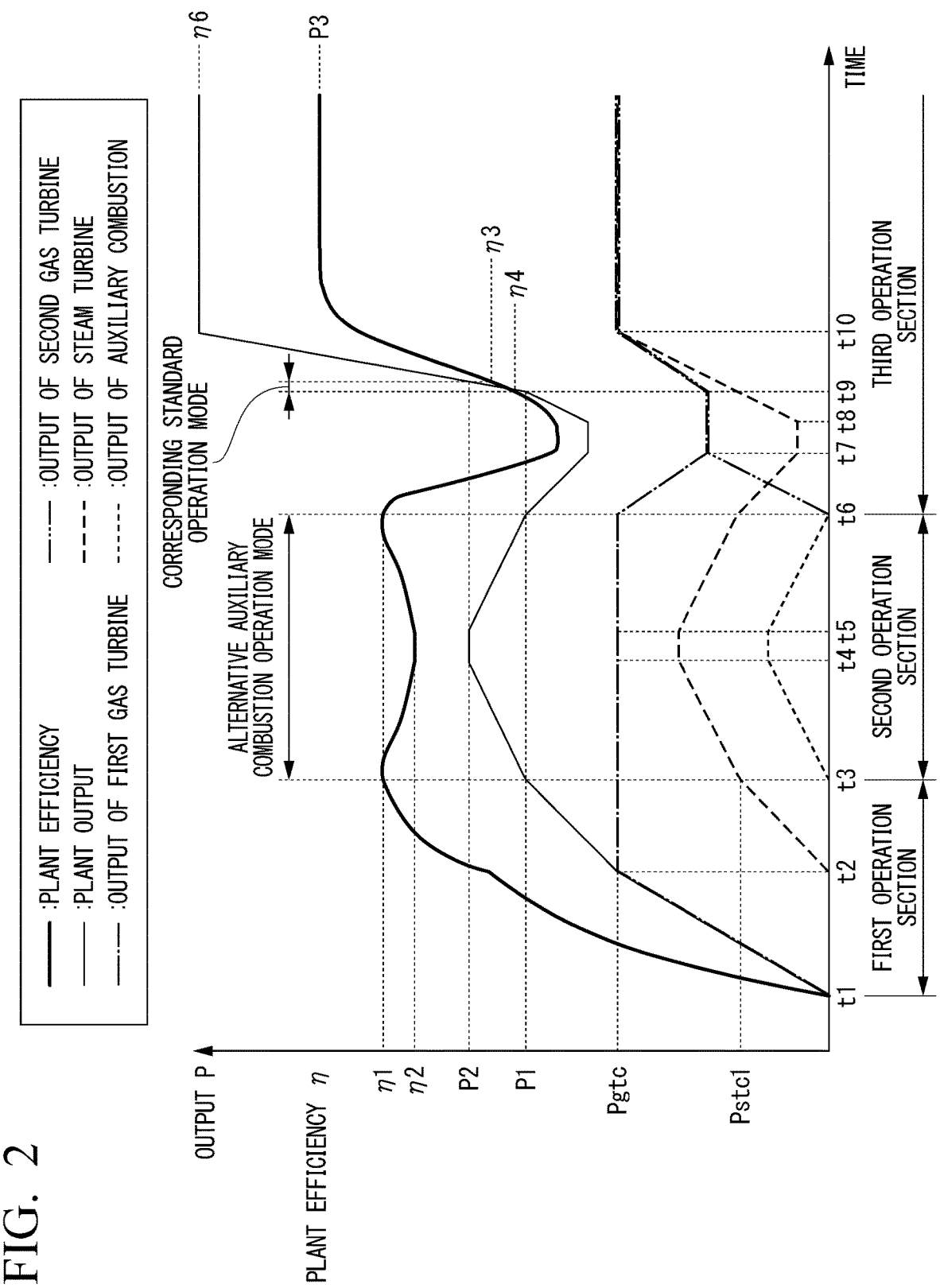
FIG. 2 is a graph showing change in a plant output and plant efficiency of the combined cycle plant of the first embodiment according to the present invention with the passage of time.

Incidentally, as shown in FIG. 2, a plant output (P1 to P2) in a time zone in which fuel is sent to the combustor 14 of the first gas turbine unit Ua and the auxiliary combustion burner 33 is the same as a plant output (P1 to P2) in a portion of a time zone (after t6) in which fuel is sent to each combustor 14 of the two gas turbine units U and not sent to each auxiliary combustion burner 33. An operation mode in a portion of the time zone in which fuel is sent to each combustor 14 of the two gas turbine units U and not sent to each auxiliary combustion burner 33 is the standard operation mode. Also, an operation mode in a time zone (t3 to t6) in which fuel is sent to the combustor 14 of the first gas turbine unit Ua and the auxiliary combustion burner 33 is the alternative auxiliary combustion operation mode with respect to the standard operation mode. Further, as described above, the standard operation mode in which a plant output thereof is the same as a plant output of the alternative auxiliary combustion operation mode is the corresponding standard operation mode.

Therefore, when the required output receiving unit 101 receives a required output of the specific range (P1 to P2), the alternative auxiliary combustion operation mode, in other words, the second operation section can be implemented as the operation mode at that time. When the required output receiving unit 101 receives a required output of the specific range (P1 to P2) (S1), as described above, the operation mode setting unit 102 determines one operation mode between the standard operation mode and the auxiliary combustion operation mode as the operation mode (S2). In the operation mode setting step (S2) at this time, a display step (S2a), an operation mode receiving step (S2b), and an operation mode determination step (S2c) are performed.

In the display step (S2a), the display unit 102a displays an indication that one operation mode (one operation section) between the alternative auxiliary combustion operation mode (second operation section) and another corresponding standard operation mode (alternative second operation section) can be selected. Further, the display unit 102a displays both the plant efficiency η when the alternative auxiliary combustion operation mode is performed and the plant efficiency η when the corresponding standard operation mode is performed. From the display content, an operator selects one operation mode between the alternative auxiliary combustion operation mode and the corresponding standard operation mode and inputs an indication to the operation mode receiving unit 102b that the one operation mode is to be performed. That is, in the operation mode receiving step (S2b), the operation mode receiving unit 102b receives one operation mode. In the operation mode determination step (S2c), the operation mode determination unit 102c sets the one operation mode as an operation mode determined by the operation mode setting unit 102.

It is assumed that the operation mode receiving unit 102b has received the alternative auxiliary combustion operation mode (the second operation section) in the operation mode receiving step (S2b). In this case, the operation mode determination unit 102c determines the alternative auxiliary combustion operation mode as the operation mode. When the alternative auxiliary combustion operation mode is determined as the operation mode, in the valve control step (S3), the valve control unit 103 determines a flow rate of fuel supplied to the combustor 14 of the first gas turbine unit Ua so that an output of the first gas turbine 10a reaches the allowable maximum output Pgtc. Also, the valve control unit 103 determines an opening degree of the main fuel valve 21 according to the flow rate of the fuel, and outputs a valve opening degree command indicating the opening degree to the main fuel valve 21 of the first gas turbine unit Ua. Further, when the plant output with the allowable maximum output Pgtc of the first gas turbine 10a is insufficient with respect to a required output, the valve control unit 103 determines a flow rate of fuel ejected from the auxiliary combustion burner 33 of the first gas turbine unit Ua so that a shortage of the plant output can be compensated by combustion of the fuel. Then, the valve control unit 103 determines an opening degree of the auxiliary combustion fuel valve 36 according to the flow rate of the fuel, and outputs a valve opening degree command indicating a valve opening degree to the auxiliary combustion fuel valve 36 of the first gas turbine unit Ua. At this time, the valve control unit 103 outputs a valve opening degree command for setting the opening degree of the main fuel valve 21 of the second gas turbine unit Ub to 0 to the main fuel valve 21, and outputs a valve opening degree command for setting the opening degree of the auxiliary combustion fuel valve 36 of the second gas turbine unit Ub to 0 to the auxiliary combustion fuel valve 36.

As a result, the operation mode of the combined cycle plant becomes the alternative auxiliary combustion operation mode. As described above with reference to FIG. 2, a range of the plant output in the alternative auxiliary combustion operation mode (second operation section) is (P1 to P2). Also, a range of the plant efficiency η in the alternative auxiliary combustion operation mode is (η1 to η2). On the other hand, when the range (P1 to P2) of the plant output is realized with the standard operation mode, the corresponding standard operation mode (alternative second operation section), which is the standard operation mode, is an operation mode in a portion of the time zone in which fuel is sent to each combustor 14 of the two gas turbine units U and not sent to each auxiliary combustion burner 33 as described above. In the corresponding standard operation mode, fuel is supplied to each combustor 14 of the two gas turbine units U at a flow rate capable of obtaining an output that is substantially a half of the allowable maximum output. Therefore, the efficiency of each gas turbine 10 of the two gas turbine units U is significantly lower than the efficiency of the gas turbine 10 when fuel is supplied to one gas turbine 10 at a flow rate capable of obtaining the allowable maximum output. Therefore, a range of the plant efficiency η η1 to η2) in the alternative auxiliary combustion operation mode is lower than the efficiency of the gas turbine 10 when the gas turbine 10 is driven at the allowable maximum output by injection of the auxiliary combustion fuel, but is higher than a range (η3 to η4) of the plant efficiency η in the standard operation mode corresponding to the alternative auxiliary combustion operation mode.

Figure 4:
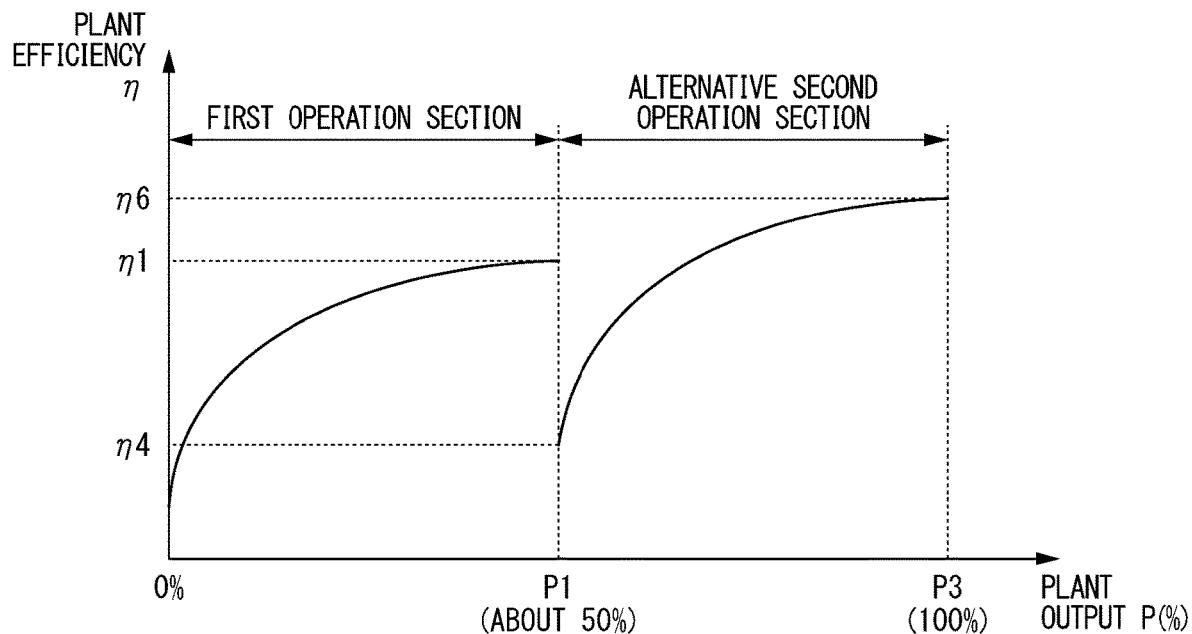
FIG. 4 is a graph showing a relationship between a plant output and plant efficiency when an auxiliary combustion operation mode is not performed in the combined cycle plant of the first embodiment according to the present invention.
Figure 5:
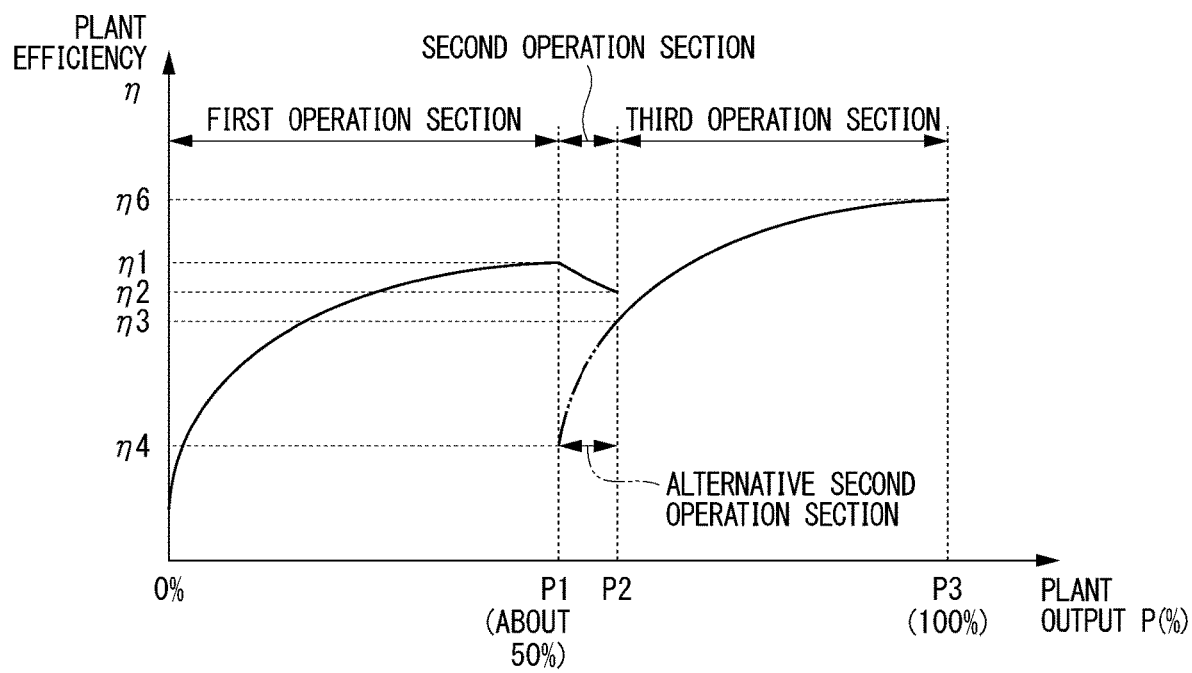
FIG. 5 is a graph showing a relationship between a plant output and plant efficiency when an auxiliary combustion operation mode is partially performed in the combined cycle plant of the first embodiment according to the present invention.

Here, a relationship between the plant output P and the plant efficiency η in the present embodiment will be described with reference to FIGS. 4 and 5. In FIGS. 4 and 5, the horizontal axis represents the plant output P, and the vertical axis represents the plant efficiency η.

FIG. 4 is a graph showing a relationship between the plant output P and the plant efficiency η when an auxiliary combustion operation mode is not performed. As shown in FIG. 4, when a required output is 0% to about 50% of the plant output P, the first operation section described above is performed. That is, the first gas turbine unit Ua is driven without driving the auxiliary combustion device 37, or the first gas turbine unit Ua and the steam turbine 40 are driven without driving the auxiliary combustion device 37. Therefore, the first operation section is a 1-on-1 operation section in which one steam turbine 40 is driven with respect to driving of one gas turbine unit U. In the first operation section, the plant efficiency η increases as the plant output P increases. The plant efficiency η at the maximum plant output P1 (about 50%) in the first operation section is η1 as described above with reference to FIG. 2.

When the required output becomes about 50% to 100%, the above-described alternative second operation section is performed. That is, the first gas turbine unit Ua, the second gas turbine unit Ub, and the steam turbine 40 are driven without driving the auxiliary combustion device 37. Therefore, the alternative second operation section is a 2-on-1 operation section in which one steam turbine 40 is driven with respect to driving of the two gas turbine units U. Also in the alternative second operation section, the plant efficiency η increases as the plant output P increases. The plant efficiency η at the maximum plant output P3 (100%) in the alternative second operation section is η6 as described above with reference to FIG. 2. The plant efficiency η6 is higher than the plant efficiency η1. This is because the efficiency of the steam turbine 40 is not highest in the first operation section, whereas the efficiency of the steam turbine 40 is highest in the alternative second operation section.

FIG. 5 is a graph showing a relationship between the plant output P and the plant efficiency η when the auxiliary combustion operation mode is partially performed. As shown in FIG. 5, when the required output is 0% to about 50% of the plant output P, the first operation section is performed as in the case shown in FIG. 4. When the required output receiving unit 101 receives a required output of a specific range (P1 (≈50%) to P2) during the first operation section, the operation mode setting unit 102 determines one operation mode between the corresponding standard operation mode (alternative second operation section) and the alternative auxiliary combustion operation mode (second operation section) as the operation mode as described above. Here, it is assumed that the operation mode setting unit 102 has determined the alternative auxiliary combustion operation mode (second operation section) as the operation mode. In the alternative auxiliary combustion operation mode (second operation section), the first gas turbine unit Ua, the auxiliary combustion device 37, and the steam turbine 40 are driven. The plant efficiency η in the second operation section gradually decreases from the maximum plant efficiency η1 in the first operation section as the plant output P increases and becomes η2 at the maximum plant output P2 in the second operation section. This is because fuel from the auxiliary combustion device 37 does not contribute to the driving of the first gas turbine 10a as described above.

Incidentally, as described above, in the corresponding standard operation mode, fuel is supplied to each combustor 14 of the two gas turbine units U at a flow rate capable of obtaining an output that is substantially a half of the allowable maximum output. Therefore, the efficiency of each gas turbine 10 of the two gas turbine units U is significantly lower than the efficiency of the gas turbine 10 (maximum efficiency of the gas turbine) when a flow rate of fuel capable of obtaining the allowable maximum output is supplied to one gas turbine 10. Therefore, when the plant output P is P1 to P2 in the corresponding standard operation mode (alternative second operation section), the plant efficiency η is η3 to η4. On the other hand, in the alternative auxiliary combustion operation mode (second operation section), although the plant efficiency η is lower than the efficiency of the gas turbine 10 when the gas turbine 10 is driven at the allowable maximum output by the injection of the auxiliary combustion fuel, the gas turbine 10 is driven at the maximum efficiency. Therefore, a range of the plant efficiency η in the alternative auxiliary combustion operation mode (second operation section) is η1 to η2 which is higher than the range of the plant efficiency (η3 to η4) in the corresponding standard operation mode (alternative second operation section when the plant output P is P1 to P2).

When the required output becomes P2 to P3 (100%), the operation mode setting unit 102 determines the standard operation mode as the operation mode, and the third operation section described above is performed. That is, the first gas turbine unit Ua, the second gas turbine unit Ub, and the steam turbine 40 are driven without driving the auxiliary combustion device 37. Therefore, the third operation section is a 2-on-1 operation section in which one steam turbine 40 is driven with respect to driving of the two gas turbine units U as in the above-described alternative second operation section. The plant efficiency η in the third operation section increases from η3 as the plant output P increases. The plant efficiency η at the maximum plant output P3 (100%) in the third operation section is η6 which is the same as the plant efficiency η6 at the maximum plant output P3 (100%) in the alternative second operation section described with reference to FIG. 4.

As described above, in the present embodiment, when the alternative auxiliary combustion operation mode, that is, the second operation section is performed, the plant efficiency η can be increased to be higher than the plant efficiency η when only the standard operation mode is performed.

Incidentally, it is conceivable that, in a short period of time after the required output receiving unit 101 has received a required output in a specific range (P1 to P2), the required output receiving unit 101 may receive another required output that is larger than the required output in the specific range (P1 to P2). In this case, at a time point at which the required output receiving unit 101 has received the required output in the specific range (P1 to P2), the time required until another required output is satisfied after receiving another required output that is larger than the required output in the specific range (P1 to P2) can be shortened when the standard operation mode with two gas turbine units U is performed rather than when the alternative auxiliary combustion operation mode with one gas turbine unit U is performed.

Therefore, in the present embodiment, even when the required output receiving unit 101 receives a required output in the specific range (P1 to P2), the required output receiving unit 101 allows the operator to select whether to perform the alternative auxiliary combustion operation mode by one gas turbine unit U or to perform the standard operation mode by two gas turbine units U so that an operation mode selected by the operator is performed.

In the present embodiment, in the display step (S2a), an indication that one operation mode between the alternative auxiliary combustion operation mode and the standard operation mode is selectable as described above, the plant efficiency η when the alternative auxiliary combustion operation mode is performed, and the plant efficiency η when the standard operation mode is performed are displayed. Therefore, the operator can easily select one operation mode between the alternative auxiliary combustion operation mode and the standard operation mode from a viewpoint of the plant efficiency η.

In the present embodiment, as described above, when the required output receiving unit 101 receives a required output of the specific range (P1 to P2), the required output receiving unit 101 allows the operator to select whether to perform the alternative auxiliary combustion operation mode by one gas turbine unit U or to perform the standard operation mode by two gas turbine units U. However, when the required output receiving unit 101 receives a required output of the specific range (P1 to P2), the alternative auxiliary combustion operation mode may always be performed.

Second Embodiment

Next, a second embodiment of a combined cycle plant according to present invention will be described with reference to FIGS. 6 and 7.

Figure 6:
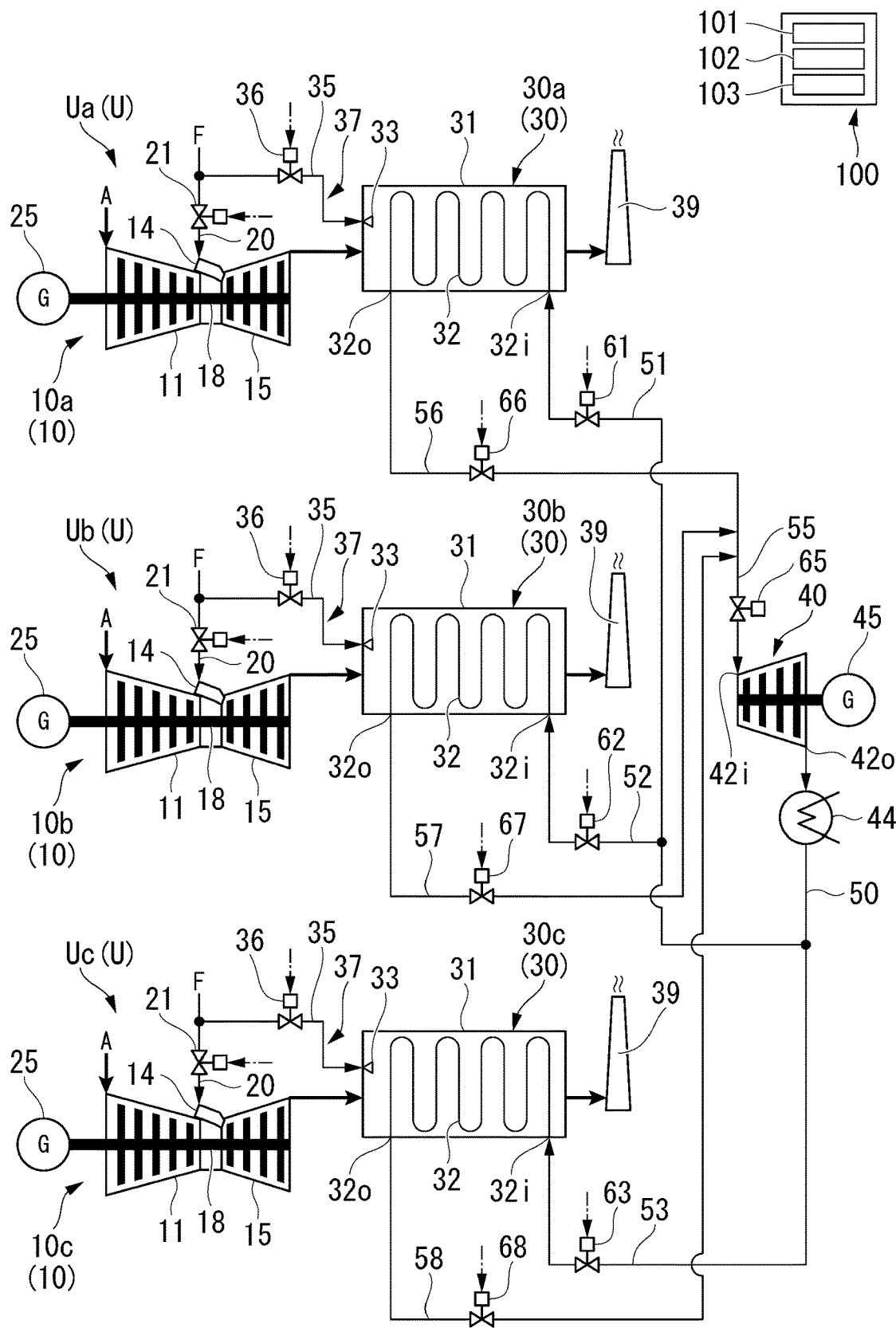
FIG. 6 is a system diagram of a combined cycle plant of a second embodiment according to the present invention.
Figure 7:
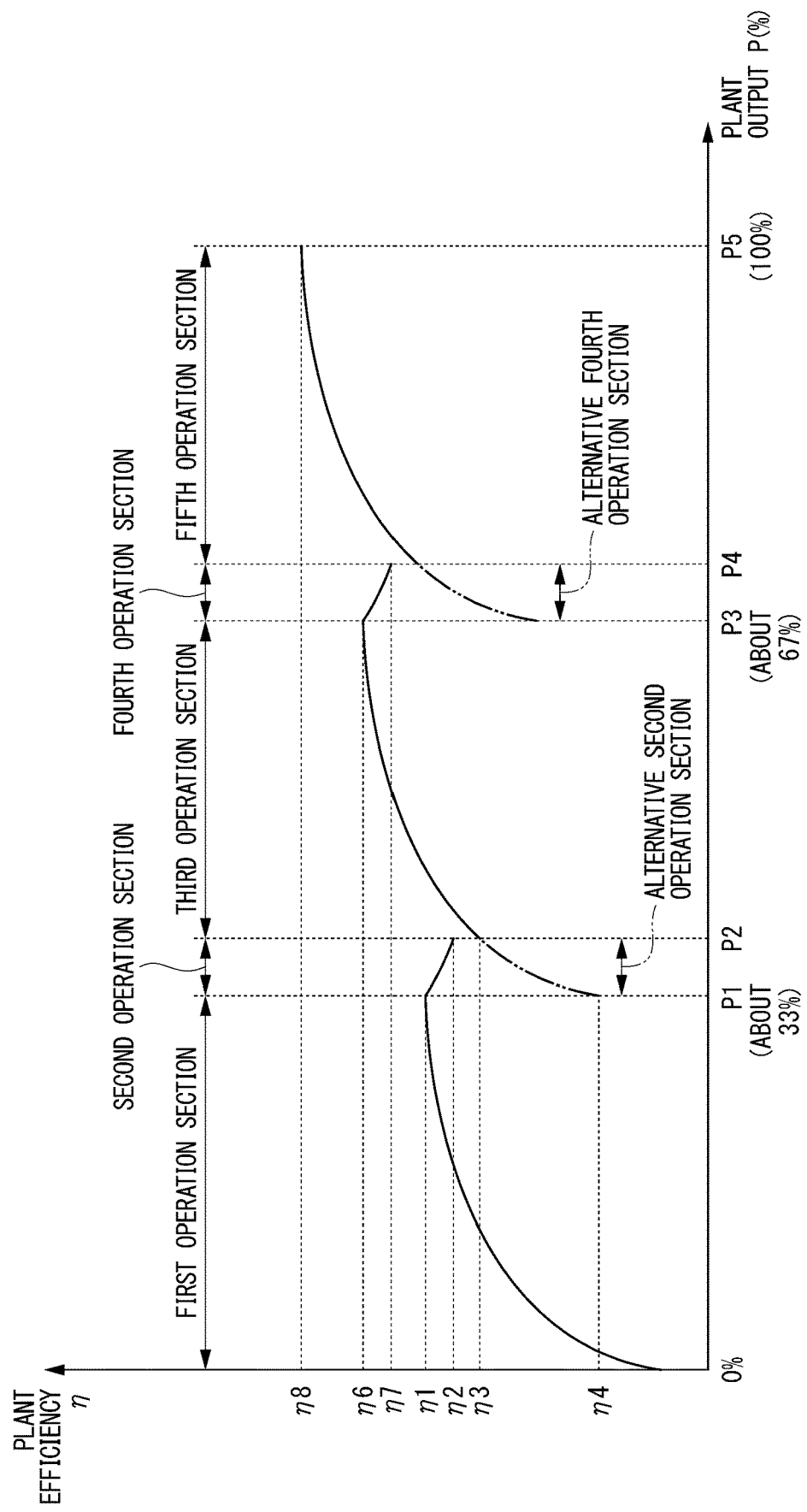
FIG. 7 is a graph showing a relationship between a plant output and plant efficiency when an auxiliary combustion operation mode is partially performed in the combined cycle plant of the second embodiment according to the present invention.

As shown in FIG. 6, the combined cycle plant of the present embodiment is a plant in which one gas turbine unit Uc is further added to the combined cycle plant of the first embodiment. That is, the combined cycle plant of the present embodiment includes three gas turbine units U, one steam turbine 40, a condenser 44 which returns steam exhausted from the steam turbine 40 to water, and a steam turbine power generator 45 which generates electric power by driving the steam turbine 40.

As in the gas turbine unit U of the first embodiment, each of the gas turbine units U in the present embodiment includes one gas turbine 10, one heat recovery steam generator (HRSG) 30 which generates steam using heat of an exhaust gas from the gas turbine 10, and one gas turbine power generator 25 which generates electric power by driving the gas turbine 10.

Each HRSG 30 of the three gas turbine units U includes a steam generator frame 31 and a heat-transfer tube 32 as in the HRSG 30 of the first embodiment. An auxiliary combustion device 37 is provided in each HRSG 30 as in the HRSG 30 of the first embodiment.

Further, for convenience of the following description, of the three gas turbine units U, the gas turbine 10 included in a first gas turbine unit Ua is referred to as a first gas turbine 10a, and the HRSG 30 included in the first gas turbine unit Ua is referred to as a first HRSG 30a. Also, of the three gas turbine units U, the gas turbine 10 included in a second gas turbine unit Ub is referred to as a second gas turbine 10b, and the HRSG 30 included in the second gas turbine unit Ub is referred to as a second HRSG 30b. Further, of the three gas turbine units U, the gas turbine 10 included in a third gas turbine unit Uc is referred to as a third gas turbine 10c, and the HRSG 30 included in the third gas turbine unit Uc is referred to as a third HRSG 30c.

The combined cycle plant of the present embodiment is a 3-on-1 type combined cycle plant in which one steam turbine 40 is provided for three gas turbine units U. The steam turbine power generator 45 which generates electric power due to driving of the steam turbine 40 is provided in the steam turbine 40. Also, one condenser 44 is provided for the three gas turbine units U in the combined cycle plant of the present embodiment.

A main water supply line 50 is connected to the condenser 44. The main water supply line 50 is branched off into three lines. Of the three lines, a first line is a first water supply line 51, a second line is a second water supply line 52, and a third line is a third water supply line 53. The first water supply line 51 is connected to a water inlet 32i of the first HRSG 30a. A first water supply valve 61 which adjusts a flow rate of water flowing through the first water supply line 51 is provided in the first water supply line 51. The second water supply line 52 is connected to a water inlet 32i of the second HRSG 30b. A second water supply valve 62 which adjusts a flow rate of water flowing through the second water supply line 52 is provided in the second water supply line 52. The third water supply line 53 is connected to a water inlet 32i of the third HRSG 30c. A third water supply valve 63 which adjusts a flow rate of water flowing through the third water supply line 53 is provided in the third water supply line 53.

A main steam line 55 is connected to a steam inlet 42i of the steam turbine 40. A main steam valve 65 which adjusts a flow rate of steam flowing through the main steam line 55 is provided in the main steam line 55. The main steam line 55 is connected to a first steam line 56, a second steam line 57, and a third steam line 58. The first steam line 56 is connected to a steam outlet 32o of the first HRSG 30a. A first steam valve 66 which adjusts a flow rate of steam flowing through the first steam line 56 is provided in the first steam line 56. The second steam line 57 is connected to a steam outlet 32o of the second HRSG 30b. A second steam valve 67 which adjusts a flow rate of steam flowing through the second steam line 57 is provided in the second steam line 57. The third steam line 58 is connected to a steam outlet 32o of the third HRSG 30c. A third steam valve 68 which adjusts a flow rate of steam flowing through the third steam line 58 is provided in the third steam line 58.

As in the control device 100 of the first embodiment, a control device 100 includes a required output receiving unit 101, an operation mode setting unit 102, and a valve control unit 103.

In an auxiliary combustion operation mode in which fuel is sent to auxiliary combustion burners 33 of (M−1) (M is a natural number of 2 or more) gas turbine units U among a plurality of gas turbine units U, when an alternative auxiliary combustion operation mode, in which a plant output thereof is the same as a plant output in a standard operation mode in which fuel is sent to combustors 14 of the M gas turbine units U, can be implemented, the operation mode setting unit 102 can determine the alternative auxiliary combustion operation mode as an operation mode thereof.

Next, a relationship between a plant output P and a plant efficiency η in the present embodiment will be described with reference to FIG. 7. In FIG. 7, the horizontal axis represents the plant output P, and the vertical axis represents the plant efficiency η.

When a required output is 0% to about 33% of the plant output P, a first operation section is performed. In the first operation section, as in the first operation section of the first embodiment, the first gas turbine unit Ua is driven without driving the auxiliary combustion device 37 or the first gas turbine unit Ua and the steam turbine 40 are driven without driving the auxiliary combustion device 37. Therefore, the first operation section is a 1-on-1 operation section in which one steam turbine 40 is driven with respect to driving of one gas turbine unit U. Also, the first operation section is a section of the standard operation mode. The plant efficiency η increases as the plant output P increases in the first operation section. The plant efficiency η at a maximum plant output P1 (about 33%) in the first operation section is η1.

When the required output receiving unit 101 receives a required output of a first specific range (P1 (≈33%) to P2) during the first operation section, the operation mode setting unit 102 determines one operation mode between a corresponding standard operation mode and the alternative auxiliary combustion operation mode (second operation section) as the operation mode. Here, it is assumed that the operation mode setting unit 102 has determined the alternative auxiliary combustion operation mode (second operation section) as the operation mode. In the alternative auxiliary combustion operation mode (second operation section), the first gas turbine unit Ua, the auxiliary combustion device 37, and the steam turbine 40 are driven. The plant efficiency η in the second operation section gradually decreases from the maximum plant efficiency η1 in the first operation section as the plant output P increases and becomes a minimum plant efficiency η2 in the second operation section at a maximum plant output P2 in the second operation section. Therefore, a range of the plant efficiency η in the alternative auxiliary combustion operation mode (second operation section) is η1 to η2 which is higher than a range of plant efficiency (η3 to η4) in the corresponding standard operation mode (alternative second operation section).

When the required output becomes P2 to P3 ($\approx 67\%$), the operation mode setting unit 102 determines the standard operation mode as the operation mode, and the third operation section is performed. In the third operation section, the first gas turbine unit Ua, the second gas turbine unit Ub, and the steam turbine 40 are driven without driving the auxiliary combustion device 37. Therefore, the third operation section is a 2-on-1 operation section in which one steam turbine 40 is driven with respect to driving of the two gas turbine units U. The plant efficiency $\eta$ in the third operation section increases from $\eta 3$ as the plant output P increases. The plant efficiency $\eta$ at the maximum plant output P3 ($\approx 67\%$) in the third operation section is a maximum plant efficiency $\eta 6$ in the third operation section.

When the required output receiving unit 101 receives a required output of a second specific range (P3 ($\approx 67\%$) to P4) during the second operation section, the operation mode setting unit 102 determines one operation mode between the corresponding standard operation mode and the alternative auxiliary combustion operation mode (fourth operation section) as the operation mode. Here, it is assumed that the operation mode setting unit 102 has determined the alternative auxiliary combustion operation mode (fourth driving section) as the operation mode. In the alternative auxiliary combustion operation mode (fourth operation section), the first gas turbine unit Ua, its auxiliary combustion device 37, the second gas turbine unit Ub, its auxiliary combustion device 37, and the steam turbine 40 are driven. The plant efficiency $\eta$ in the fourth operation section gradually decreases from the maximum plant efficiency $\eta 6$ in the third operation section as the plant output P increases and becomes a minimum plant efficiency $\eta 7$ in the fourth operation section at a maximum plant output P4 in the fourth operation section. A range of the plant efficiency $\eta$ in the alternative auxiliary combustion operation mode (fourth operation section) is $\eta 6$ to $\eta 7$ which is higher than a range of the plant efficiency in the corresponding standard operation mode (alternative fourth operation section).

When the required output becomes P4 to P5 (=100%), the operation mode setting unit 102 determines the standard operation mode as the operation mode, and a fifth operation section is performed. In the fifth operation section, none of the auxiliary combustion devices 37 is driven, and the first gas turbine unit Ua, the second gas turbine unit Ub, the third gas turbine unit Uc, and the steam turbine 40 are driven. Therefore, the fifth operation section is a 3-on-1 operation section in which one steam turbine 40 is driven with respect to driving of the three gas turbine units U. The plant efficiency $\eta$ in the fifth operation section increases as the plant output P increases. The plant efficiency $\eta$ at a maximum plant output P5 (=100%) in the fifth operation section is a maximum plant efficiency $\eta 8$ in the fifth operation section. The maximum plant output P5 in the fifth operation section is the maximum plant output in the plant of the present embodiment.

As described above, also in the present embodiment, as in the first embodiment, when the alternative auxiliary combustion operation mode, that is, the second operation section and/or the fourth operation section is performed, the plant efficiency $\eta$ can be increased to be higher than the plant efficiency $\eta$ when only the standard operation mode is performed.

Incidentally, the combined cycle plant of the first embodiment is a 2-on-1 type combined cycle plant in which one steam turbine 40 is provided for two gas turbine units U. On the other hand, the combined cycle plant of the present embodiment is a 3-on-1 type combined cycle plant in which one steam turbine 40 is provided for three gas turbine units U. Therefore, three or more gas turbine units U may be provided with respect to one steam turbine 40.

Third Embodiment

Figure 8:
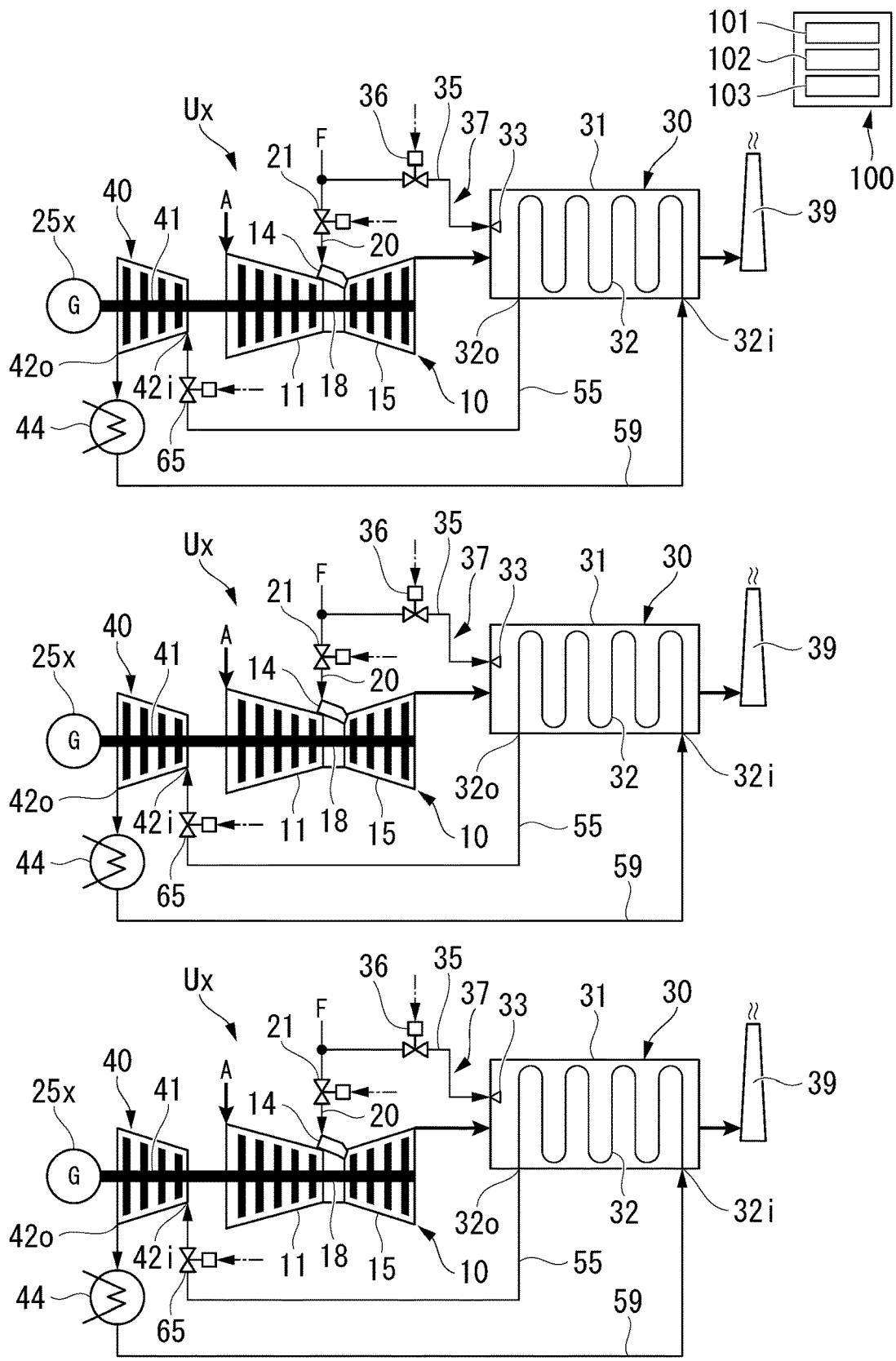
FIG. 8 is a system diagram of a combined cycle plant of a third embodiment according to the present invention.

Next, a third embodiment of a combined cycle plant according to the present invention will be described with reference to FIG. 8.

The combined cycle plant of the present embodiment includes three gas turbine units Ux, three steam turbines 40, three condensers 44, and a control device 100.

As in the gas turbine unit U of the first embodiment, each the three gas turbine units Ux includes one gas turbine 10, one heat recovery steam generator (HRSG) 30 which is configured to generate steam using heat of an exhaust gas from the gas turbine 10, and one power generator 25x which is configured to generate electric power by driving the gas turbine 10.

Each HRSG 30 of the three gas turbine units Ux includes a steam generator frame 31 and a heat-transfer tube 32 as in the HRSG 30 of the first embodiment. An auxiliary combustion device 37 is provided in each HRSG 30 as in the HRSG 30 of the first embodiment.

In the combined cycle plant of the present embodiment, one steam turbine 40 is provided for each of the three gas turbine units Ux. That is, the combined cycle plant of the present embodiment is a 1-on-1 type combined cycle plant in which one steam turbine 40 is provided for one gas turbine 10. Also, in the combined cycle plant of the present embodiment, one condenser 44 is provided for each of the three gas turbine units Ux. Therefore, a steam outlet 32$o$ of the HRSG 30 in one gas turbine unit Ux is connected to only a steam inlet 42$i$ of one steam turbine 40 by a main steam line 55. Also, a water inlet 32$i$ of the HRSG 30 in one gas turbine unit Ux is connected to only one condenser 44 by a water supply line 59.

A steam turbine rotor 41 in one steam turbine 40 is mechanically connected to a gas turbine rotor 18 in one gas turbine 10. That is, the combined cycle plant of the present embodiment is a uniaxial type combined cycle plant. The power generator 25$x$ is mechanically connected to the steam turbine rotor 41 or the gas turbine rotor 18. Therefore, the power generator 25$x$ generates electric power when the gas turbine 10 and the steam turbine 40 are driven as well as when the gas turbine 10 is driven alone.

As in the control device 100 of the first embodiment, the control device 100 includes a required output receiving unit 101, an operation mode setting unit 102, and a valve control unit 103.

In an auxiliary combustion operation mode in which fuel is sent to auxiliary combustion burners 33 of (M−1) (M is a natural number of 2 or more) gas turbine units Ux among a plurality of gas turbine units Ux, when the alternative auxiliary combustion operation mode, in which a plant output thereof is the same as a plant output in a standard operation mode in which fuel is sent to combustors 14 of the M gas turbine units Ux, can be implemented, the operation mode setting unit 102 can determine the alternative auxiliary combustion operation mode as the operation mode.

Specifically, in the auxiliary combustion operation mode in which fuel is sent to the auxiliary combustion burner 33 of one gas turbine unit Ux, when the alternative auxiliary combustion operation mode, in which a plant output thereof is the same as the plant output in the standard operation mode in which fuel is sent to combustors 14 of two gas turbine units Ux, can be implemented, the operation mode setting unit 102 can determine the alternative auxiliary combustion operation mode as the operation mode. Further, in the auxiliary combustion operation mode in which fuel is sent to the auxiliary combustion burners 33 of two gas turbine unit Ux, when the alternative auxiliary combustion operation mode, in which a plant output thereof is the same as the plant output in the standard operation mode in which fuel is sent to combustors 14 of three gas turbine units Ux, can be implemented, the operation mode setting unit 102 can determine the alternative auxiliary combustion operation mode as the operation mode.

Accordingly, also in the present embodiment, the plant efficiency η can be increased as in the first embodiment.

Incidentally, the combined cycle plant of the first embodiment includes two gas turbine units U. On the other hand, the combined cycle plant of the second embodiment and the present embodiment includes three gas turbine units Ux. Therefore, the number of gas turbine units provided in the combined cycle plant is not limited as long as it is two or more.

The combined cycle plant of the first embodiment is a 2-on-1 type combined cycle plant in which one steam turbine 40 is provided for two gas turbines 10. Also, the combined cycle plant of the second embodiment is a 3-on-1 type combined cycle plant in which one steam turbine 40 is provided for three gas turbines 10. On the other hand, the combined cycle plant of the present embodiment is a 1-on-1 type combined cycle plant in which one steam turbine 40 is provided for one gas turbine 10 as described above. Therefore, the combined cycle plant may be a multi-on-1 type or a 1-on-1 type.

The combined cycle plants of the first embodiment and the second embodiment are multiaxial type combined cycle plants in which the gas turbine rotor 18 and the steam turbine rotor 41 are not mechanically connected. On the other hand, the combined cycle plant of the present embodiment is a uniaxial type combined cycle plant in which the gas turbine rotor 18 and the steam turbine rotor 41 are mechanically connected as described above. Therefore, the combined cycle plant may be a multiaxial type or a uniaxial type.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES

U, Ux Gas turbine unit
Ua First gas turbine unit
Ub Second gas turbine unit
Uc Third gas turbine unit
10 Gas turbine
10a First gas turbine
10b Second gas turbine
10c Third gas turbine
11 Compressor
12 Compressor rotor
13 Compressor casing
14 Combustor
15 Turbine
16 Turbine rotor
17 Turbine casing
17o Exhaust port
18 Gas turbine rotor
20 Main fuel line
21 Main fuel valve
25 Gas turbine power generator
25x Power generator
30 HRSG (Heat recovery steam generator)
30a First HRSG (first heat recovery steam generator)
30b Second HRSG (second heat recovery steam generator)
30c Third HRSG (third heat recovery steam generator)
31 Steam generator frame
31i Exhaust gas inlet
31o Exhaust gas outlet
32 Heat-transfer tube
32i Water inlet
32o Steam outlet
33 Auxiliary combustion burner
35 Auxiliary combustion fuel line
36 Auxiliary combustion fuel valve
39 Chimney
40 Steam turbine
41 Steam turbine rotor
42 Steam turbine casing
42i Steam inlet
42o Steam exhaust port
44 Condenser
45 Steam turbine power generator
50 Main water supply line
51 First water supply line
52 Second water supply line
53 Third water supply line
55 Main steam line
56 First steam line
57 Second steam line
58 Third steam line
59 Water supply line
61 First water supply valve
62 Second water supply valve
63 Third water supply valve
65 Main steam valve
66 First steam valve
67 Second steam valve
68 Third steam valve
100 Control device
101 Required output receiving unit
102 Operation mode setting unit
102a Display unit
102b Operation mode receiving unit
102c Operation mode determination unit
103 Valve control unit

What is claimed is:

1. An operation method of a combined cycle plant comprising:
 a first gas turbine unit including a first gas turbine and a first heat recovery steam generator which is configured to generate steam using heat of an exhaust gas of the first gas turbine;
 a steam turbine which is configured to be driven by steam generated from the first heat recovery steam generator;
 an auxiliary combustion device which is configured to burn fuel in a steam generator frame of the first heat recovery steam generator to increase an amount of generated steam so that an output of the steam turbine is increased; and
 a second gas turbine unit including a second gas turbine and a second heat recovery steam generator which is configured to generate steam using heat of an exhaust gas of the second gas turbine, the operation method of the combined cycle plant executing:

a first operation section in which the first gas turbine unit is driven without driving the auxiliary combustion device, or the first gas turbine unit and the steam turbine are driven without driving the auxiliary combustion device;

a second operation section in which the first gas turbine unit, the auxiliary combustion device, and the steam turbine are driven when a required output that is equal to or greater than a maximum output in the first operation section is received; and a third operation section in which the first gas turbine unit, the second gas turbine unit, and the steam turbine are driven without driving the auxiliary combustion device when a required output that is equal to or greater than a maximum output in the second operation section is received.

2. The operation method of the combined cycle plant according to claim 1, wherein any one of performance of an alternative second operation section in which the first gas turbine unit, the second gas turbine unit, and the steam turbine are driven without driving the auxiliary combustion device, and performance of the second operation section is selectable when a required output that is equal to or greater than a maximum output in the first operation section is received.

3. The operation method of the combined cycle plant according to claim 2, wherein an indication that any one of the alternative second operation section and the second operation section is executable is displayed when a required output that is equal to or greater than a maximum output in the first operation section is received.

4. The operation method of the combined cycle plant according to claim 3, wherein a plant efficiency when the alternative second operation section is performed and a plant efficiency when the second operation section is performed are displayed.

5. A control device of a combined cycle plant including:

a first gas turbine unit including a first gas turbine and a first heat recovery steam generator which is configured to generate steam using heat of an exhaust gas of the first gas turbine;

a steam turbine which is configured to be driven by steam generated from the first heat recovery steam generator;

an auxiliary combustion device which is configured to burn fuel in a steam generator frame of the first heat recovery steam generator to increase an amount of generated steam so that an output of the steam turbine is increased; and a second gas turbine unit including a second gas turbine and a second heat recovery steam generator which is configured to generate steam using heat of an exhaust gas of the second gas turbine, the control device of the combined cycle plant comprising a control unit which controls the first gas turbine unit, the steam turbine, the auxiliary combustion device, and the second gas turbine unit such that they are able to perform:

a first operation section in which the first gas turbine unit is driven without driving the auxiliary combustion device, or the first gas turbine unit and the steam turbine are driven without driving the auxiliary combustion device;

a second operation section in which the first gas turbine unit, the auxiliary combustion device, and the steam turbine are driven when a required output that is equal to or greater than a maximum output in the first operation section is received; and a third operation section in which the first gas turbine unit, the second gas turbine unit, and the steam turbine are driven without driving the auxiliary combustion device when a required output that is equal to or greater than a maximum output in the second operation section is received.

6. The control device of the combined cycle plant according to claim 5, further comprising a receiving unit which receives any one selection between an alternative second operation section in which the first gas turbine unit, the second gas turbine unit, and the steam turbine are driven without driving the auxiliary combustion device, and the second operation section, and causes the control unit to perform the received operation section when a required output that is equal to or greater than a maximum output in the first operation section is received.

7. The control device of the combined cycle plant according to claim 6, further comprising a display unit which displays an indication that any one of the alternative second operation section and the second operation section is executable when a required output that is equal to or greater than a maximum output in the first operation section is received.

8. The control device of the combined cycle plant according to claim 7, wherein the display unit displays a plant efficiency when the alternative second operation section is performed and a plant efficiency when the second operation section is performed.

9. A combined cycle plant comprising:

the control device of the combined cycle plant according to claim 5;

the first gas turbine unit;

the steam turbine;

the auxiliary combustion device; and the second gas turbine unit.

* * * * *